Figure 1:
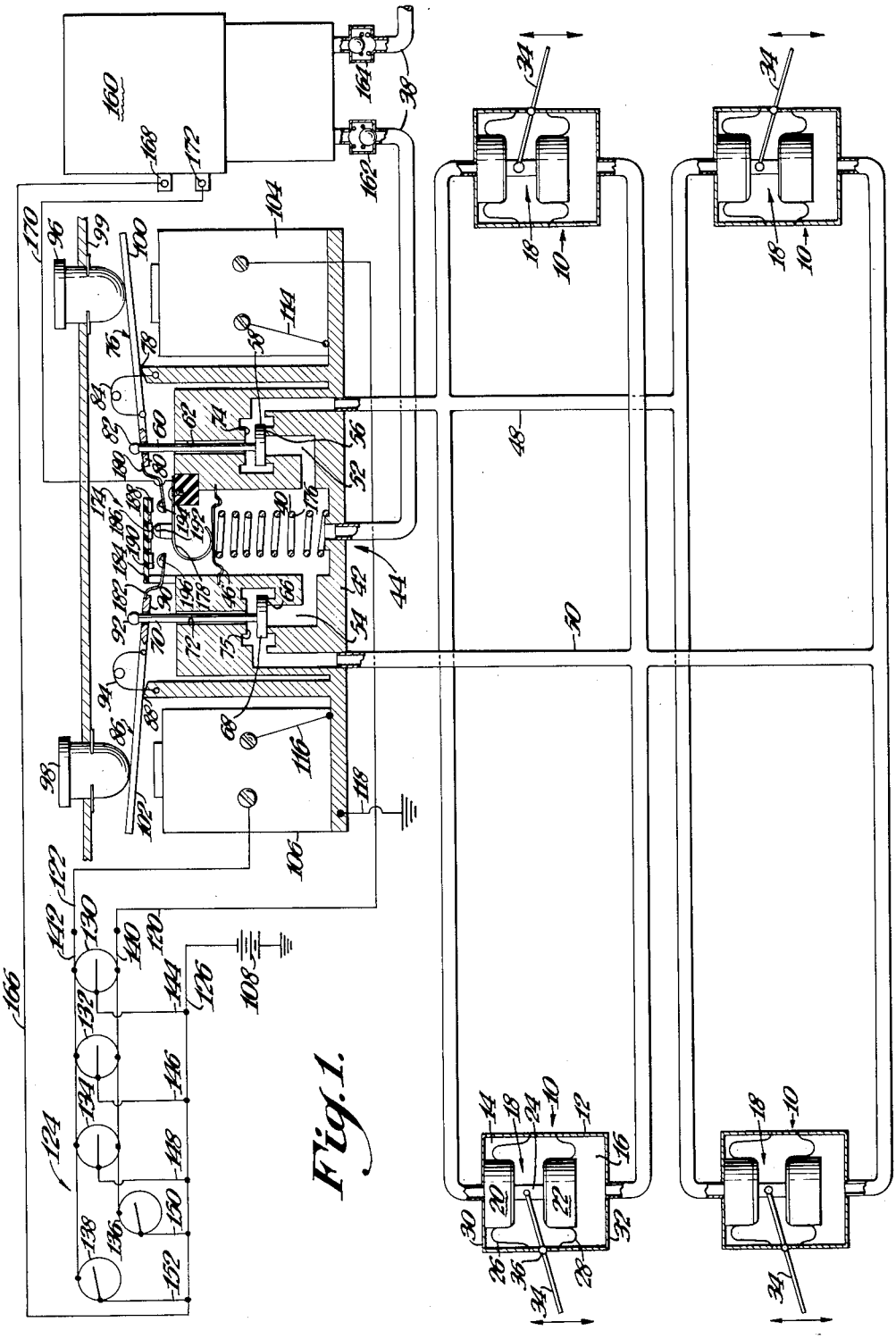

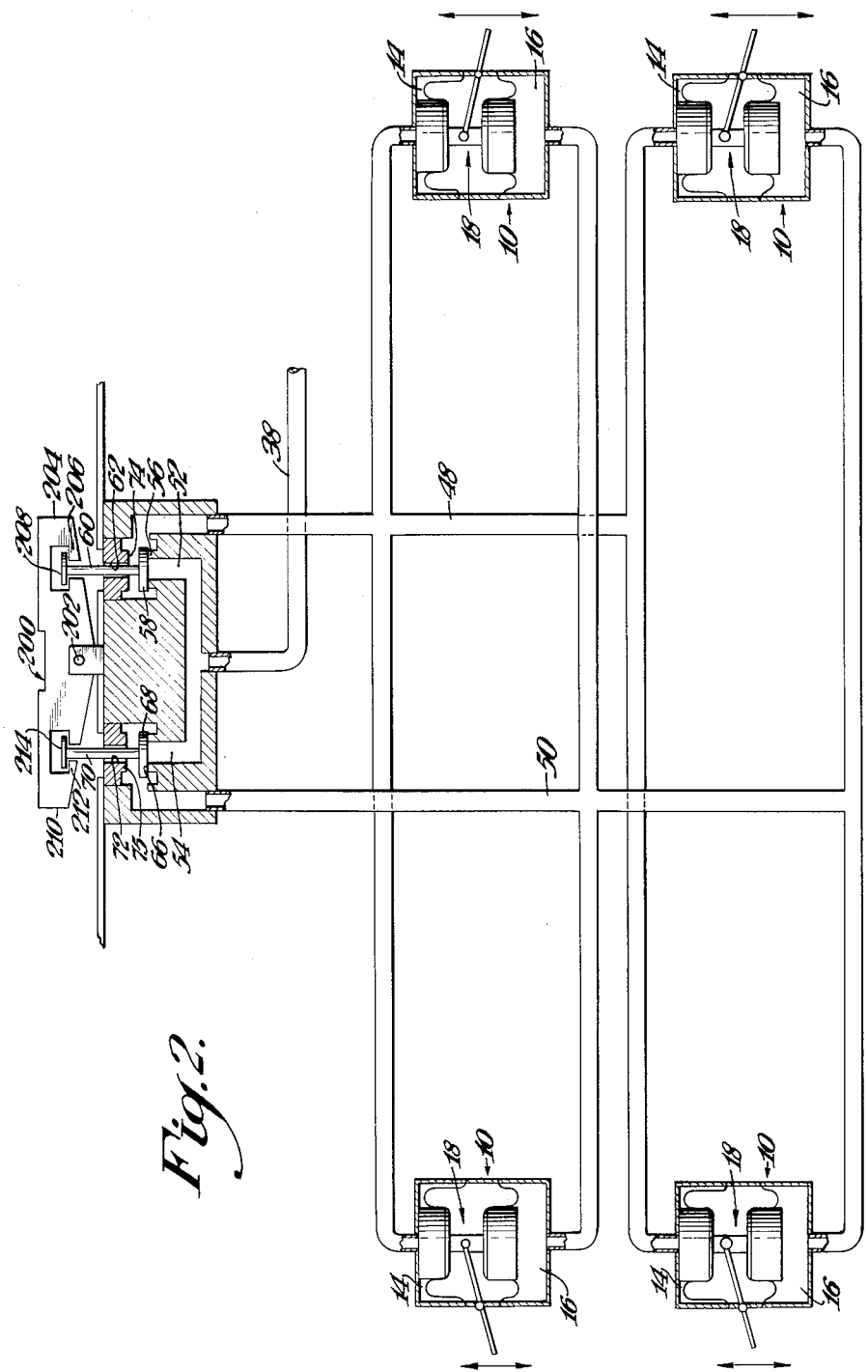

United States Patent Office 2,974,742
Patented Mar. 14, 1961

2,974,742
MOTOR VEHICLE DOOR LOCK SYSTEM

Hugh J. Tyler, Jeannette, Pa., assignor to Robertshaw-Fulton Controls Company, Richmond, Va., a corporation of Delaware Filed Apr. 24, 1959, Ser. No. 808,769
2 Claims. (Cl. 180—82)

This invention relates to door lock systems and, more particularly, to vacuum-operated door lock systems for automobiles and the like.

A complete door lock system for an automobile would include both locking and unlocking mechanisms, control means for locking and unlocking from the driver's position, means under the control of the door key locks for locking and unlocking the doors, an arrangement whereby small children cannot unlock the rear doors from the rear seat of the automobile, means under the control of the transmission shift lever for automatically locking the door when the transmission shift lever is in a "drive" position, and means for automatically unlocking all the doors in case of an accidental rollover of the automobile.

Automobile door lock systems proposed in the past have been unsatisfactory because they have been incomplete systems and have limited utility. For example, automobile door lock systems in use today are primarily locking systems and have no unlocking mechanisms.

One of the major factors which retarded the development of a practical and complete automobile door lock system is that the electromagnetic systems of this type are expensive. Another factor is that electromagnetic devices, such as solenoids, require close sliding fits and have limited power which makes them comparatively unreliable devices. While vacuum-operated door lock systems have the advantage of low cost, reliability, and ample power, the ones hereinbefore provided cannot be operated without engine vacuum. Another problem is that remote control from multiple locations is difficult with vacuum lines.

It is an object of this invention to provide a practical and complete vacuum-operated door lock system.

Another object of this invention is to construct a vacuum-operated automobile door lock system which can be operated without engine vacuum and which can be remotely controlled from multiple locations.

Another object of this invention is to utilize an auxiliary pump which operates only when the engine vacuum is lacking in a vacuum-operated automobile door lock system.

In a preferred embodiment of the invention, a door lock actuator is provided for each door to be controlled by the system. This actuator includes a pressure responsive means which divides the actuator into a pair of chambers and is movable between locking and unlocking positions in accordance with which of the chambers has a vacuum applied thereto. Each of the pressure responsive means is connected to the door lock of the door with which it is associated. Conduit means are provided for connecting each of the actuator chambers to a vacuum supply. A control valve is serially connected in the conduit means and is operative to control the application of a vacuum to one or the other of the actuator chambers. The control valve is adapted to be operated by manual control or by remote control from a plurality of locations.

The above and other objects and features of the invention will appear more fully from a consideration of the following description taken in connection with the accompanying drawings wherein:

Fig. 1 is a schematic illustration of a preferred embodiment of the invention; and Fig. 2 is a schematic illustration of a modified form of the invention.

Referring now to Fig. 1, the automobile door lock system embodying the invention comprises a door lock actuator 10 for each door of the automobile. Each actuator 10 has a casing 12 divided into a pair of chambers 14 and 16 by a pressure responsive means 18. Each pressure responsive means 18 comprises a pair of cup members 20 and 22 connected at the bases thereof by a shaft 24 and a pair of diaphragms 26 and 28 which cooperate with the casing 12 to define chambers 14 and 16, respectively.

Each pressure responsive means 18 is movable between the position shown in Fig. 1, wherein cup 20 engages one end 30 of casing 12, and a position in which cup 22 engages the opposite end 32 of casing 12 in response to the occurrence of a vacuum in chambers 14 and 16, respectively. Each actuator 10 has a lever 34 pivotally mounted on casing 12 at a medial portion 36 and having one end connected to shaft 24. Thus, each lever 34 is pivotally movable, as shown by the arrows in Fig. 1, between a pair of alternate positions in accordance with the position of each of the pressure responsive means 18.

Since each of the pressure responsive means 18 is movable between alternate positions, as previously described, in response to the occurrence of a vacuum in chambers 14 and 16, it is apparent that the lever 34 will be positioned in accordance with the occurrence of a vacuum in chambers 14 and 16. Each of the levers 34 may be connected to the door lock of the door with which the actuator 10 is associated for locking and unlocking the same, the actuators 10 being shown in the unlocking position in Fig. 1. It is thus apparent that the application of a vacuum to chamber 14 unlocks the door while the application of a vacuum to chamber 16 locks the door.

Means are provided for connecting actuators 10 to a vacuum source. To this end, a conduit means 38 is connected between the engine vacuum and a control chamber 40 in the body 42 of a control valve 44. Control chamber 40 is closed at one end by a movable diaphragm 46 of an insulating material. A pair of conduit means 48 and 50 are connected between control chamber 40 and the actuator chambers 14 and 16, respectively. Control valve body 42 has a passageway 52 interconnecting control chamber 40 and conduit means 48 and a passageway 54 interconnecting control chamber 40 and conduit means 50.

A valve seat 56 is formed on body 42 to intersect passageway 52 and has a valve member 58 cooperable therewith for opening and closing passageway 52. Valve member 58 is mounted on a valve stem 60 which is axially slidable within a bore 62 in body 42. Bore 62 also serves to vent passageway 52 to atmosphere. A valve seat 66 is formed on body 42 to intersect passageway 54 and has a valve member 68 cooperable therewith for opening and closing passageway 54. Valve member 68 is mounted on a valve stem 70 which is axially slidable within a bore 72 in body 42. Bore 72 also serves to vent passageway 54 to atmosphere. Valve member 58 is also cooperable with a valve seat 74 formed on body 42 in opposed relation to valve seat 56 to intersect bore 62 and valve member 68 is cooperable with a valve seat 75 formed on body 42 in opposed relation to valve seat 66 to intersect bore 72.

Valve members 58 and 68 are biased by their own weight into engagement with seats 56 and 66, respectively, to thereby close passageways 52 and 54. Lever means are provided for actuating either of the valve members 58 and 68 away from their normal position into engagement with valve seats 74 and 75, respectively, to thereby open either of the passageways 52 and 54. To this end, a lever arm 76 is fulcrumed at a medial portion on a fulcrum 78 formed on body 42 for pivotal movement thereabout. The inner end 80 of lever arm 76 is adapted to engage the underside of an expanded portion 82 on the exterior of valve stem 60. A spring member 84 is mounted between body 42 and lever arm 76 to bias the latter in a counterclockwise direction about fulcrum 78 so that end 80 permits valve member 58 to rest in engagement with valve seat 56. It will be apparent that movement of lever arm 76 in a clockwise direction against the bias thereof will lift valve stem 60 thereby moving valve member 58 out of engagement with valve seat 56 and into engagement with valve seat 74 to open passageway 52 and close bore 62.

A lever arm 86 is also provided for actuating valve member 68 from valve seat 66 to valve seat 75. Lever arm 86 is fulcrumed at a medial portion on a fulcrum 88 formed on body 42 and pivots thereabout. The inner end 90 of lever arm 86 is adapted to engage the underside of an expanded portion 92 on the exterior end of valve stem 70. A spring means 94 is mounted between body 42 and lever arm 86 to bias the latter in a clockwise direction about fulcrum 88 so that end 102 permits valve member 68 to rest in engagement with valve seat 66. It will be apparent that movement of lever arm 86 in a counterclockwise direction against the bias thereof will lift valve stem 70 thereby moving valve member 68 out of engagement with valve seat 66 into engagement with valve seat 75 to open passageway 54 and close bore 72.

Manual means are provided for actuating lever arms 76 and 86 against the biases thereof. Such means may take the form of a pair of buttons 96 and 98 which may be mounted on the dash panel 99 of the automobile with button 96 being positioned for engagement with the outer end 100 of lever arm 76 and button 98 being positioned for engagement with the outer end 102 of lever arm 86. Depression of button 96 will cause clockwise movement of lever arm 76 against the bias thereof to lift valve stem 60 thereby moving valve member 58 to open passageway 52 and close bore 62. Depression of button 98 will cause counterclockwise movement of lever arm 86 against the bias thereof to lift valve member 70, thereby moving valve member 68 to open passageway 54 and close bore 72.

Remote control means are also provided for actuating lever arms 76 and 86 against the biases thereof. Such means may take the form of a pair of electromagnets 104 and 106 positioned on control valve body 42 in opposed relation to opposite ends 100 and 102 of lever arms 76 and 86, respectively. Since lever arms 76 and 86 are made of magnetic material, ends 100 and 102 thereof will be attracted to the electromagnets 104 and 106, respectively, upon energization thereof. Hence, lever arm 76 will be rotated clockwise against the bias thereof to open passageway 52 upon energization of electromagnet 104 and lever arm 86 will be rotated counterclockwise against the bias thereof to open passageway 54 upon energization of electromagnet 106.

Circuit means are provided for connecting electromagnets 104 and 106 to a source of electric energy, such as a battery 108. To this end, one terminal of electromagnet 104 and one terminal of electromagnet 106 are connected to the control valve body 42 by a pair of conductors 114 and 116, respectively. The control valve body 42 is grounded by a conductor 118 connected between control valve body 42 and the frame of the automobile. The other terminals of electromagnets 104 and 106 are connected by a pair of conductors 120 and 122, respectively, to a parallel circuit portion 124, which is connected to battery 108 by a conductor 126.

Parallel circuit portion 124 comprises three double-acting switches 130, 132, and 134, two single-acting switches 136 and 138, a conductor 140 which connects one terminal of double-acting switches 130, 132, and 134, and one terminal of single-acting switch 136 to conductor 120, a conductor 142 which connects the other terminal of double-acting switches 130, 132, and 134, and one terminal of single-acting switch 138 to conductor 122, and conductors 144, 146, 148, 150, and 152, which connect the switch arms of switches 130, 132, 134, 136, and 138, respectively, to conductor 126.

It will thus be apparent that double-acting switches 130, 132, and 134 are operable to control the flow of electrical energy from battery 108 to either of the electromagnets 104 and 106 in accordance with the position of the switch arms thereof. Single-acting switches 136 and 138 are operable to control the flow of electric energy from battery 108 to electromagnets 104 and 106, respectively.

In the operation of the system thus far described, the completion of a circuit between conductor 126 and conductor 140, by the action of any of switches 130, 132, 134, and 136, will cause energization of electromagnet 104. Electromagnet 104 will thus attract the outer end 100 of lever arm 76 to cause clockwise rotation of the same. By this rotative movement, lever arm 76 actuates valve member 58 out of engagement with valve seat 56 and into engagement with valve seat 74, as was previously described. The vacuum applied to control chamber 40 through conduit 38 is thus applied to actuator chambers 14 through passageway 52 and conduit means 48. In response to the occurrence of a vacuum in actuator chamber 14 and of atmospheric pressure in actuator chambers 16 applied through bore 72, passageway 54 and conduit means 50, each of the pressure responsive means 18 is moved to the position shown in Fig. 1 whereby levers 34 are in the unlocking position.

In a like manner, the completion of a circuit between conductor 126 and conductor 142 by the action of any of the switches 130, 132, 134, and 138, will cause energization of the electromagnet 106. Electromagnet 106 will attract outer end 102 of lever arm 86 to cause counterclockwise rotation of the same. By this rotative movement, lever arm 86 actuates valve member 68 out of engagement with valve seat 66 and into engagement with valve seat 75 as was previously described. The vacuum applied to control chamber 40 through conduit 38 is thus applied to actuator chamber 16 through passageway 54 and conduit means 50. In response to the occurrence of a vacuum in actuator chamber 16 and of atmospheric pressure in actuator chamber 14 applied through bore 62, passageway 52 and conduit means 48, each of the pressure responsive means 18 is moved to the position in which cup 22 engages end 32 whereby levers 34 are moved to the locking position.

Hence, lever arm 76 controls the unlocking of the door locks and lever arm 86 controls the locking of the door locks. It is to be noted that in order to actuate the pressure responsive means 18 from one controlling position to the other, a vacuum need only be applied momentarily wherefore lever arms 76 and 86 need be rotated only momentarily from the normal positions thereof.

To provide a complete automobile door lock system, the switch arms of switches 130 and 132 may be operatively connected to the key locks of the front doors for movement between the open and closed positions thereof in accordance with the position of the key locks. The switch arms of the double-acting switch 134 may be operatively connected to a pushbutton on the dash panel to provide for remote control of the electromagnets 104 and 106 from inside of the automobile. The single-acting switch 138 may be operatively connected to the transmission shift lever for movement to momentarily close a circuit to electromagnet 106 when the transmission shift lever is placed in a "drive" position. The switch arm of single-acting switch 136 may be operatively connected to an actuating means which would close switch 136 to thereby close the circuit to electromagnet 104 in case of accidental rollover of the automobile.

It will thus be apparent that the vacuum-operated door lock system provided is complete in that it includes unlocking and locking mechanisms (actuators 10), control means for locking and unlocking from the driver's position (switch 134 or buttons 96 and 98), means under the control of the door key locks for locking and unlocking the doors (switches 130 and 132), means under the control of the transmission shift lever for automatically locking the doors when the transmission shift lever is in a "drive" position (switch 138), and means for automatically unlocking all of the doors in case of an accidental rollover of the automobile (switch 136). Also, since all four doors may be controlled only from a dash panel, there is no possibility of small children in the rear seat accidentally unlocking the rear doors.

Means are also provided for insuring operation of this system when the engine vacuum is lacking. To this end, an electrically controlled auxiliary vacuum pump 160 is connected in conduit 38. A pair of check valves 162 and 164 are associated with auxiliary pump 160 to insure that the vacuum produced thereby is applied to control chamber 40 and to maintain a one-way airflow through a bypass in the auxiliary pump 160 when engine vacuum is available.

Auxiliary pump 160 may be of any suitable type and is electrically controlled by a circuit having a conductor 166 connected between one terminal 168 of the auxiliary pump electric actuating means (not shown) and battery 108 and another conductor 170 connected between the other electric actuating means terminal 172 and ground through a control switch means 174 responsive to the engine vacuum. Control switch means 174 includes movable diaphragm 46 which is responsive to the pressure in control chamber 40 and a spring 176 which biases diaphragm 46 outwardly. It will be apparent that the occurrence of a vacuum within control chamber 40 will cause diaphragm 46 to move inwardly against the bias of spring 176.

Control switch means 174 includes a resilient contact arm 178 having one end biased into engagement with the outer face of diaphragm 46 for movement therewith and the other end insulatedly mounted on control valve body 42 and connected to conductor 170. A pair of resilient contact arms 180 and 182 are mounted on the ends of lever arms 76 and 86, respectively, and a stationary contact arm 184 is insulatedly mounted on control valve body 42 to overlie a portion of contact arms 178, 180, and 182. Three contacts 186, 188, 190 are mounted on contact arm 184 in opposed relation to contacts 192, 194, and 196 mounted on contact arms 178, 180, and 182, respectively.

Contact 192 is movable with contact arm 178 into and out of engagement with contact 186 in accordance with the amount of vacuum in control chamber 40. Under normal vacuum conditions, contact 192 will be maintained out of engagement with contact 186. However, should the vacuum drop below that required to operate actuators 10, contact 192 will be moved into engagement with contact 186 by action of diaphragm 46 and contact arm 178 under the bias of spring 176.

Contacts 194 and 196 are movable with contact arms 180 and 182 into and out of engagement with contacts 188 and 190, respectively, in accordance with the position of lever arms 76 and 86. Contacts 194 and 196 are normally maintained out of engagement with contacts 180 and 182, respectively. However, rotative movement of lever arm 76 by action of button 96 or electromagnet 104 will cause contact 194 to engage contact 188. Likewise, rotative movement of lever arm 78 by action of button 98 or electromagnet 106 will cause contact 196 to engage contact 190.

The electrical connection of auxiliary pump 160 to battery 108 may be effected through two circuits. One circuit may be traced as follows: from battery 108, through conductor 126, conductor 166, terminals 168 and 172 of auxiliary pump 160, conductor 170, contact arm 178, contacts 192 and 186, contact arm 184, contacts 188 and 194, contact arm 180, lever arm 76, control valve body 42, and conductor 118 to ground. The other circuit is similar except that from conductor 170 it may be traced as follows: contact arm 178, contacts 192 and 186, contact arm 184, contacts 190 and 196, lever arm 86, control valve body 42, conductor 118 to ground.

By this construction, control switch means 174 only permits energization of auxiliary pump 160 when the engine vacuum is lacking whereby contacts 186 and 192 are closed and either of the lever arms 76 or 86 have been rotated, in accordance with the desired locking or unlocking operation, so that either contacts 188 and 194 or contacts 190 and 196 are closed.

Under normal operating conditions, there is sufficient engine vacuum applied to control chamber 40 to cause pressure responsive diaphragm 46 to compress spring 176 and maintain contact 192 out of engagement with contact 186. Hence, even though actuation of lever 76 to the unlocking position thereof or lever 86 to the locking position thereof would close contacts 188 and 194 or contacts 190 and 196, respectively, there will be no energization of auxiliary pump 160 because of open contacts 186 and 192. However, should the engine vacuum become lacking, diaphragm 46 will move outwardly to cause the closing of contacts 186 and 192. Thus, any subsequent actuation of lever arm 76 or lever arm 86 to the active positions thereof will cause energization of auxiliary pump 160 through the circuits previously described.

Auxiliary pump 160 is then operative to create a vacuum which is applied to control chamber 40 through conduit 38 and which may pass through either of the passageways 52 or 54 in accordance with which of the lever arms 76 or 86 has been actuated. As soon as the actuating lever arm is returned to its normal position, thereby breaking the control circuit, auxiliary pump 160 will be deenergized. However, the momentary vacuum which was created by auxiliary pump 160 will have served its desired purpose, namely, the actuation of pressure responsive means 18 to the desired control position.

The embodiment of the invention shown in Fig. 2, wherein parts corresponding to the parts hereinbefore described are given like reference numerals, is a partial system which is completely vacuum-operated. A lever arm 200 is provided for actuating valve members 58 and 68 to open passageways 52 and 54, respectively. Lever arm 200 is pivotally mounted on a pivot 202. One leg 204 of lever arm 200 has a shoulder portion 206 engageable with the underside of a flange 208 formed on the upper end of valve stem 60 to raise the same along with valve member 58 upon counterclockwise rotation of lever arm 200. The other leg 210 of lever arm 200 has a shoulder portion 212 engageable with the underside of a flange 214 formed on the upper end of valve stem 70 to raise the same along with valve member 68 upon clockwise rotation of lever arm 200.

It will thus be apparent that counterclockwise rotation of lever arm 200 to open passageway 52 and close bore 62 will permit engine vacuum to be applied to actuator chambers 14 through conduit 38, passageway 52, and conduit means 48, thereby unlocking the automobile doors as was previously described with respect to the Fig. 1 embodiment. In a like manner, clockwise rotation of lever arm 200 to open passageway 54 and close bore 72 will permit the engine vacuum to be applied to actuator chambers 16 through conduit 38, passageway 54, and conduit means 50, thereby locking the automobile doors.

Although the partial system disclosed in Fig. 2 does not have all of the features of the Fig. 1 embodiment,

I claim:

1. A door lock system comprising a plurality of pressure responsive vacuum operated door lock actuators being adapted for moving locking means between locked and unlocked operating positions, a control valve mechanism having a chamber therein and being adapted for selectively actuating said actuators, conduit means operatively connecting said control valve mechanism to said plurality of actuators, a first source of vacuum connected to said chamber, a plurality of electromagnetic means, a lever means operatively associated with each of said electromagnetic means and being adapted for actuation by said electromagnetic means, a plurality of valve members positioned between said chamber and said conduit means each being adapted for movement by one of said lever means to control pressure between said chamber and said conduit, a source of electrical energy, a plurality of switch means for selectively connecting said electromagnetic means to said electrical source, an auxiliary electrically energized vacuum pump means operatively connected intermediate said vacuum source and said chamber, a contact located on each lever means and being adapted to engage stationary contacts upon energization of said electromagnetic means, and a third contact operatively movable in response to the pressure in said chamber and operatively connecting said vacuum pump in series circuit to said electrical energy source upon reduction of the vacuum within said chamber below a predetermined pressure, whereby said vacuum is increased so that said actuators are retained in one or the other predetermined actuated condition.

2. A system as claimed in claim 1 wherein a flexible diaphragm forms one wall of said chamber, a resilient member being positioned within said chamber and being adapted to bias said diaphragm, an arm being adapted to engage said diaphragm for movement therewith, said third contact being mounted on said arm and being adapted to engage said stationary contact upon movement of said diaphragm in response to a reduction of vacuum in said chamber to energize the electrical circuit of said vacuum pump upon reduction of the vacuum within said chamber whereby said auxiliary vacuum pump is the vacuum source until the first source of vacuum is operative.

References Cited in the file of this patent

UNITED STATES PATENTS

| | | |
|---|---|---|
| 2,006,624 | Block | July 2, 1935 |
| 2,103,702 | Tibbetts | Dec. 28, 1937 |
| 2,167,675 | Palmer | Aug. 1, 1939 |
| 2,323,519 | Dean | July 6, 1943 |
| 2,822,203 | Griswold et al. | Feb. 4, 1958 |